July 6, 1954 W. G. TOLAND ET AL 2,682,822
FURROW WHEEL MOUNTING FOR PLOWS
Filed Sept. 8, 1950 2 Sheets-Sheet 1

Inventors:
Wayne G. Toland
Frederick M. Pierson
By: Paul O. Pippel
Atty.

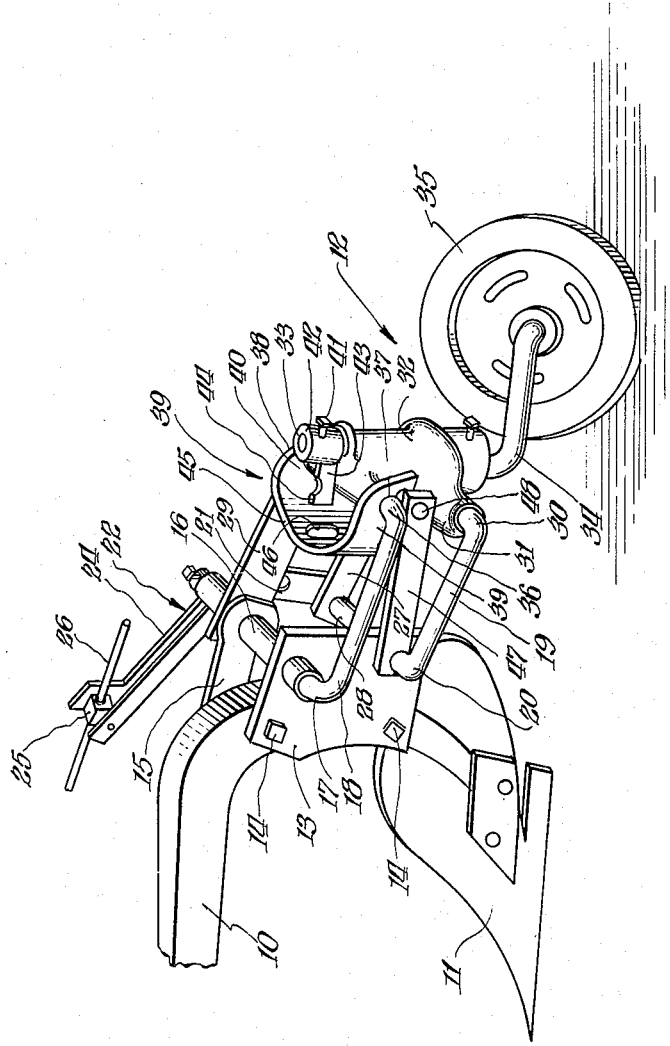

Patented July 6, 1954

2,682,822

UNITED STATES PATENT OFFICE 2,682,822

FURROW WHEEL MOUNTING FOR PLOWS

Wayne G. Toland and Frederick M. Pierson, Canton, Ill., assignors to International Harvester Company, a corporation of New Jersey Application September 8, 1950, Serial No. 183,826

2 Claims. (Cl. 97—127)

This application relates to agricultural implements and particularly to plows. More specifically the invention concerns a rear furrow wheel mounting for a plow.

A moldboard plow, particularly a trail-behind plow such as that with which this invention is concerned, is subjected to considerable side draft when propelled by a tractor and strains are set up which are injurious to the plow and interfere with the proper operation of the implement. In an effort to offset this side draft, it is customary to provide a rear furrow wheel which is mounted upon the plow frame or beam and is capable of movement in a vertical direction to carry the plow in transport along with the other plow supporting wheels normally provided. This rear furrow wheel rides in the furrow formed by the plow bottoms and usually presses against the furrow wall.

When the plow bottoms have been lowered with respect to this rear furrow wheel and are in operating position, it is desirable that the furrow wheel be held in a straight line in the direction of travel and not be permitted to caster substantially. On the other hand, when the plow has been raised to transport position, it is desirable that the rear furrow wheel caster to facilitate transporting the implement. An object of the present invention is to provide improved means for mounting a rear furrow wheel on a plow for vertical movement with respect thereto.

Another object of the invention is to provide improved means automatically operable when the plow moves to its operating position to lock the furrow wheel against castering, said lock being released upon movement of the implement to transport position to permit castering of the wheel.

Another object of the invention is to provide improved mounting means for carrying a rear furrow wheel on a plow and including parallel linkage providing vertical movement of the furrow wheel in a substantially straight line and means operable to lock the wheel against castering in working position.

A further object of the invention is to provide in a rear furrow wheel assembly for a plow or the like a movable hood-like member mounted on the connecting linkage between the furrow wheel and the plow frame which is movable into a position to lock the furrow wheel against castering in its working position. The hood-like member is provided with a slot which moves into a position to receive a projection which is affixed to the furrow wheel spindle.

Other objects and advatages of the invention will become clear from the following detailed description when read in conjunction with the accompanying drawings, wherein:

Fig. 2 is a view in perspective of the furrow wheel assembly.

Figure 1:
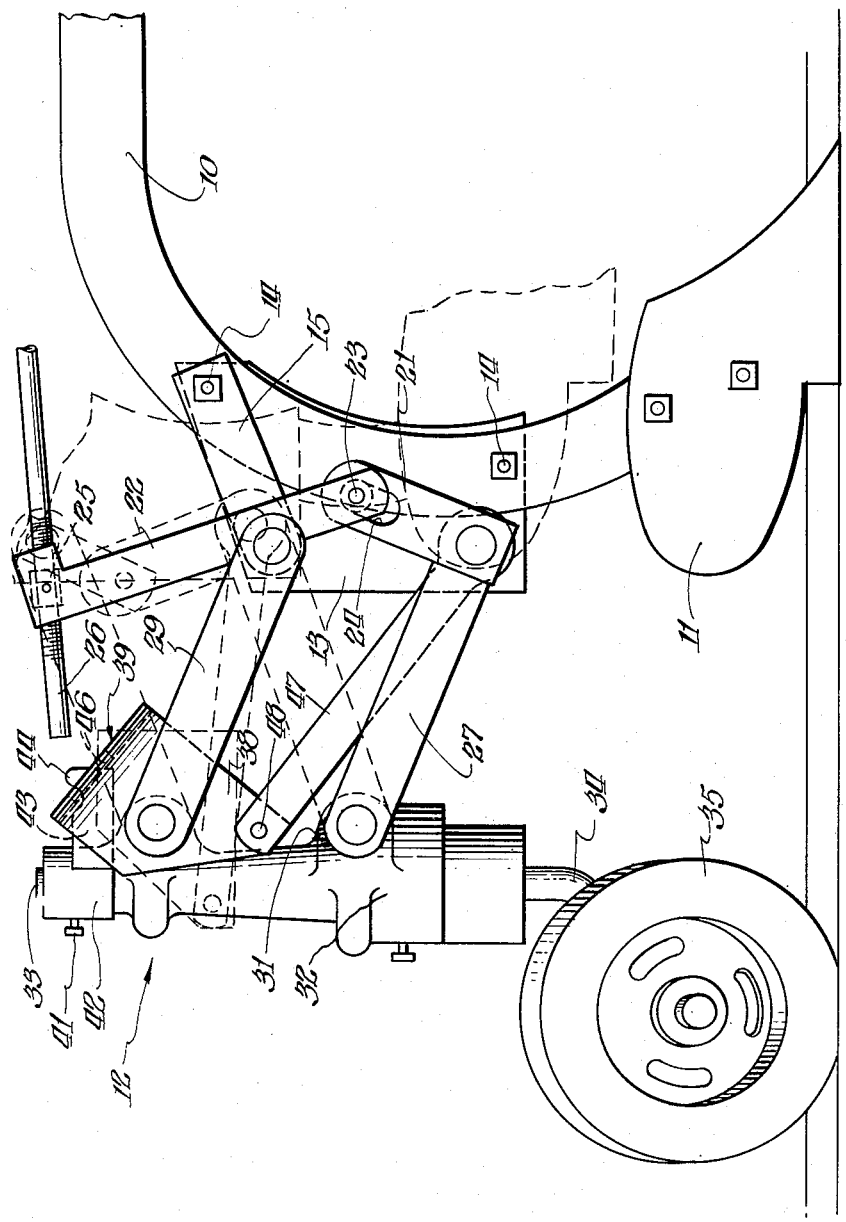
Fig. 1 is a view in side elevation showing the rear end of a moldboard plow with a rear furrow wheel assembly embodying the features of the present invention mounted thereupon.

Referring to the drawings, the numeral 10 designates the frame of a trail-behind moldboard plow in the form of a beam curved downwardly and forwardly at its rear end to provide a support for a plow bottom 11. Plow frame 10 also provides a support for a rear furrow wheel assembly 12. A plate 13 is secured to the side of the beam 10 on the downwardly curved rear end thereof by bolts 14. A bracket 15 is also secured to the beam on the other side thereof from the plate 13 and the projecting portions thereof are spaced by the sleeve 16 which serves as a bearing to receive the transversely bent end 17 of a rearwardly extending link 18. Likewise supported by the plate 13 for pivotal movement in a manner similar to link 18 and vertically spaced below the latter is another link 19 having a transverse portion 20 mounted in the plate and extending rearwardly therefrom. The other end of the transverse portion 20 of link 19 is supported by a pivoted link 21 connected to a lever 22 fulcrumed upon the end of transverse portion 17 of link 18. The connection of link 21 to lever 22 is made by a pin 23 carried by one end of lever 22 and receivable in a slot 24 formed in link 21. The lever 22 is provided with a swivel 25 in the bifurcated end thereof and the swivel has a threaded aperture to receive the threaded end of a connecting rod 26, which extends forwardly and is connected in a manner well known in the art to lifting mechanism by which the other wheels of the plow are vertically moved with respect to the plow frame in order to raise and lower the tools. Operation of the lifting mechanism, not shown, through the connecting rod 26 to rock the lever 22 will vertically swing links 18 and 19 about their respective pivots on the frame of the plow, as will hereinafter appear. In transverse parallelism with the lower link 19 and on the opposite side of the frame is a link 27 which is spaced from the plate 13 by a sleeve 28. Likewise transversely spaced from the link 18 is another upper link 29 mounted upon the transverse portion 17 of the upper link 18 and extending rearwardly therefrom.

The lower link 19 is provided at its rear end with a transverse portion 30 which is journaled in a bearing 31 forming a part of a casting 32 which extends generally vertically and in which is rotatably mounted the vertically extending spindle portion 33 of a wheel axle 34, upon the lower bent end of which is mounted the rear furrow wheel 35. The rear end of the lower link 27 is pivoted upon the opposite end of the transverse portion 30 of link 19. The forward end of link 27 is apertured to pivotally receive the end of transverse portion 30 and is affixed, as by welding, to the lower end of link 21. Rocking of lever 22 about its pivot on transverse portion 17 is transmitted through pin 23 to rock links 21 and 27 to vertically move the casting 32 and wheel 35.

The transverse portion 36 of upper parallel link 18 extends transversely through and between the arms 37 and 38 of the U-shaped hood-like member 39 having an arcuate inner contour for a purpose to be hereinafter set forth. A pivot bearing 40 projecting from the casting 32 surrounds the transverse portion 36 of link 18 between the arms of the hood-like member, and the rear end of the upper link 29 on the opposite side of the plow frame is pivotally mounted upon the projecting end of the transverse portion 36 of link 18.

The upper end of spindle 33 has secured thereto by means of a set screw 41 a cap 42 to which is affixed as by welding or the like a radially extending projection 43 having at its end an upwardly extending ear 44.

In the bight portion 45 of the U-shaped member 39 is formed an elongated slot 46 which, when the U-shaped member is rocked about its axis upon the transverse portion 36 of the upper link 18, receives the end of the projecting member 43. Since this projection 43 is secured to the spindle 33 of the wheel axle, it is clear that when this projection is received in the slot 36 the wheel 35 cannot caster. Rocking of the member 39 about its pivot on the link 18 is accomplished by means of a strap 47 which is pivotally mounted at its forward end upon the transverse portion 20 of lower link 19 and at its rear end is pivoted upon a pin 48 carried in the arm 37 of the U-shaped member 39. The pin 48 is mounted on the arm 37 at a location spaced rearwardly from the axis of the member upon the transverse portion 36 of the upper parallel link 18. Thus leverage is provided whereby the U-shaped member 39 may be rocked about its pivot. This is accomplished automatically during the vertical operation of the furrow wheel assembly relative to the plow frame to raise or lower the earth working tools by virtue of the positioning of strap 47 with its forward end mounted upon the lower link 19 and its rear end upon the U-shaped member 39. During vertical swinging of the links about the pivots of their transverse portions 17 and 20, the links 18 and 47 move through different arcs. In the view shown in Fig. 1 the implement is in its earth working position with the projection 43 received in the slot 46. Upon moving the implement to the transport position shown in Fig. 2, the rear ends of the links 18 and 19 swing downwardly about their pivots on the plow frame and the U-shaped member 39 is rocked in a clockwise direction as viewed in Fig. 2. Link 47 serves to rock the U-shaped hood about its pivot during vertical movement of the wheel assembly and also functions as a stop to limit the rocking movement of the member.

It is believed that a novel rear furrow wheel assembly and mounting structure has been described which provides a mechanism for locking the furrow wheel against castering in its operating position and releases the furrow wheel for castering in its transport position, while providing vertical movement of the furrow wheel relative to the plow frame in a substantially straight line by means of a generally parallel link suspension. While the implement has been shown in its preferred embodiment it should be understood that modifications may be made therein without departing from the spirit of the invention or the scope of the appended claims.

What is claimed is:

1. In a rear furrow wheel supporting structure for a plow or the like comprising a pair of vertically spaced generally parallel links pivoted at one end on the plow frame for vertical swinging movement and extending rearwardly therefrom, a wheel support including an axle having an upwardly extending portion and a wheel at its lower end, a housing in which said axle portion is rotatably mounted having means pivotally supporting the rear ends of the upper and lower of said links on the housing, a radial projection on the upper portion of said axle having an upwardly extending ear, a U-shaped member pivotally supported on the housing on a common axis with the rear end of the upper of said links and straddling said projection, said U-shaped member having a slot in the bight portion thereof adapted to receive said ear in the operating position of the plow and wheel to prevent castering of the latter, and means for moving the U-shaped member away from said ear about its pivot on said housing during lifting, comprising a link pivotally connected at one end to the pivot of the lower of said parallel links on the plow frame and at its other end to the U-shaped member at a location spaced from the pivotal connection thereof with the housing.

2. In a rear furrow wheel supporting structure for a plow or the like comprising a pair of vertically spaced generally parallel links pivoted at one end on the plow frame for vertical swinging movement and extending rearwardly therefrom, a wheel support including an upwardly extending axle having a wheel at its lower end, a housing in which the axle is rotatively mounted to accommodate castering of the wheel and to which the rear ends of said links are pivotally connected, a radial projection on the upper portion of said axle, an arcuately shaped hood member having arms straddling said projection pivotally mounted on the housing on a common axis with the rear end of the upper of said links and a notched bight portion, said member being pivotable about its connection to said housing to and from a position with said projection received in said notch to respectively restrain or permit castering of the wheel, connecting means between one of said links and said member operative during vertical movement of the wheel and links about the pivots of the latter on the plow frame to swing said member about its pivot axis, said connecting means comprising a strap pivotally mounted at one end on the pivot axis of said lower link on the plow frame, and at its other end to one of the arms of said arcuate member at a location spaced from the pivot axis thereof.

References Cited in the file of this patent

UNITED STATES PATENTS

| Number | Name | Date |
| --- | --- | --- |
| 1,387,406 | Kaupke | Aug. 9, 1921 |
| 1,489,467 | Strandlund | Apr. 8, 1924 |
| 1,865,598 | Verity | July 5, 1932 |